US011803656B2

(12) United States Patent
Ben Itay et al.

(10) Patent No.: US 11,803,656 B2
(45) Date of Patent: Oct. 31, 2023

(54) SUPPLYING PERSONAL INFORMATION BETWEEN DIFFERENT DEVICES USING DIFFERENT PLATFORMS

(71) Applicant: Microsoft Technology Licensing, LLC, Redmond, WA (US)

(72) Inventors: Meir Ben Itay, Sammamish, WA (US); Shrey Nitin Shah, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 446 days.

(21) Appl. No.: 16/780,757

(22) Filed: Feb. 3, 2020

(65) Prior Publication Data

US 2021/0103675 A1   Apr. 8, 2021

Related U.S. Application Data

(60) Provisional application No. 62/911,191, filed on Oct. 4, 2019.

(51) Int. Cl.
*G06F 3/00* (2006.01)
*G06F 21/62* (2013.01)
*G06F 9/54* (2006.01)

(52) U.S. Cl.
CPC ............ *G06F 21/6245* (2013.01); *G06F 9/54* (2013.01)

(58) Field of Classification Search
CPC ...................................................... G06F 9/541

(Continued)

(56) References Cited

U.S. PATENT DOCUMENTS

| 5,329,619 A | 7/1994 | Page et al. | |
|---|---|---|---|
| 6,067,416 A * | 5/2000 | Fraser | G06F 8/61 |
| | | | 705/51 |

(Continued)

FOREIGN PATENT DOCUMENTS

| EP | 2608098 A1 | 6/2013 |
|---|---|---|
| WO | 2007137166 A2 | 11/2007 |
| WO | 2015127253 A1 | 8/2015 |

OTHER PUBLICATIONS

J T Zhao, Management of API Gateway Based on Micro-service Architecture (Year: 2018).*

(Continued)

*Primary Examiner* — Lechi Truong
(74) *Attorney, Agent, or Firm* — RAY QUINNEY & NEBEKER; Tiffany Healy

(57) ABSTRACT

An application that is running on a first computing device can receive personal information from a personal information manager that is running on a second computing device. The first computing device can operate using a first platform and the second computing device can operate using a second platform that is different from the first platform. The first computing device can include a first broker, and the second computing device can include a second broker. The first broker and the second broker can be configured to establish a trusted connection between the first computing device and the second computing device. The first broker can additionally be configured to request personal information from the personal information manager via the second broker. The first broker can be configured to automatically request the personal information in response to determining that the application on the first computing device has requested the personal information.

18 Claims, 9 Drawing Sheets

(58) Field of Classification Search
USPC ............................................................ 719/328
See application file for complete search history.

(56) References Cited

U.S. PATENT DOCUMENTS

| | | | |
|---|---|---|---|
| 8,768,847 B2 | 7/2014 | Burger et al. | |
| 8,965,957 B2 | 2/2015 | Barros | |
| 9,407,665 B2 | 8/2016 | Grodzicki et al. | |
| 9,479,498 B2 | 10/2016 | Kohlenberg et al. | |
| 2008/0167970 A1* | 7/2008 | Nissim | G06Q 40/12 705/26.42 |
| 2012/0124091 A1 | 5/2012 | Wong et al. | |
| 2012/0210119 A1* | 8/2012 | Baxter | G06Q 30/0253 713/150 |
| 2012/0216133 A1* | 8/2012 | Barker | G06F 21/629 715/760 |
| 2013/0054803 A1* | 2/2013 | Shepard | G06F 21/6281 709/225 |
| 2013/0167159 A1* | 6/2013 | Ricci | B60W 40/08 719/319 |
| 2013/0205360 A1* | 8/2013 | Novak | H04L 63/0884 726/1 |
| 2014/0359748 A1* | 12/2014 | Rizzo | H04L 63/0869 726/10 |
| 2014/0359784 A1 | 12/2014 | Faysom et al. | |
| 2015/0254119 A1 | 9/2015 | Gallardo et al. | |
| 2016/0330172 A1* | 11/2016 | Muttik | G06F 21/6245 |
| 2017/0301013 A1* | 10/2017 | Alejo | G06Q 40/025 |
| 2018/0203655 A1* | 7/2018 | Nishida | G06F 3/122 |
| 2018/0219846 A1* | 8/2018 | Poschel | H04L 63/10 |

OTHER PUBLICATIONS

Haksoo Choi, SensorSafe: a Framework for Privacy-Preserving Management of Personal Sensory Information. (Year: 2011).*

Hung-Min Sun, oPass: A User Authentication Protocol Resistant to Password Stealing and Password Reuse Attacks. (Year: 2012).*

Soon Choul Kim, Study of Security Management System based on ClientBerver model. (Year: 1999).*

"Brokered Auth in Android", Retrieved from: https://docs.microsoft.com/en-us/azure/active-directory/develop/brokered-auth, Sep. 14, 2019, 6 Pages.

Non Provisional Application as filed in U.S. Appl. No. 16/237,434, filed Dec. 31, 2018, 31 Pages.

McCarney, et al., "Tapas: Design, Implementation, and Usability Evaluation of a Password Manager", In Proceedings of the 28th Annual Computer Security Applications Conference, Dec. 3, 2012, pp. 89-98.

Otterbein, et al., "The German eID as an Authentication Token on Android Devices", In the Repository of arXiv:1701.04013, Jan. 15, 2017, 8 Pages.

"International Search Report and Written Opinion Issued in PCT Application No. PCT/US2020/046725", dated Nov. 12, 2020, 14 Pages.

* cited by examiner

SUPPLYING PERSONAL INFORMATION BETWEEN DIFFERENT DEVICES USING DIFFERENT PLATFORMS

CROSS-REFERENCE TO RELATED APPLICATIONS

This application is related to and claims the benefit of U.S. Provisional Patent Application No. 62/911,191 filed on Oct. 4, 2019. The aforementioned application is expressly incorporated herein by reference in its entirety.

BACKGROUND

Computing devices affect nearly every aspect of modern living. There are many different types of computing devices in use today, including desktop computers, laptop computers, smartphones, tablet computers, smartwatches, virtual reality headsets, fitness trackers, and so forth. Computing devices may be used to perform a wide variety of tasks, such as accessing websites via the Internet, using word processing software to create documents, playing video games, composing and sending email and/or text messages, watching videos, listening to music, and so forth.

Users are often required to supply personal information in order to use a computing device or one or more features of the computing device. For example, a user may be required to enter a password, sometimes in combination with a username, before the user is permitted to begin using a computing device.

In addition, users are often required to supply personal information in order to take some action on a computing device. For example, a website can require a user to supply a username and password before being permitted to access the website's content. In the context of e-commerce, a user can be required to supply a credit card number (or the account number of another type of financial account) in order to purchase something online.

Because it can be difficult for users to remember all of the personal information that they need for interactions involving computing devices (including online interactions), personal information managers have been created to help users keep track of their personal information. One example of a personal information manager is a password manager, which assists in generating and retrieving complex passwords. Such passwords can potentially be stored in an encrypted database or calculated on demand. Password managers can be implemented as locally installed software applications, online services accessed through website portals, or combinations thereof.

Personal information managers can manage other types of information besides passwords. Some examples of such information include address information (e.g., home address, business address), financial account information (e.g., credit card number, checking account number), account information for customer loyalty programs (e.g., an account number for a frequent flyer program), and government identification information (e.g., driver's license number, Social Security number).

Many people frequently use more than one computing device. For example, many people use both a desktop computer and at least one mobile device (e.g., a smartphone, a tablet computer, a laptop computer) on a regular basis. The mobile device can be useful for certain types of actions (e.g., making phone calls, sending and receiving text messages), while the desktop computer can be more convenient for other types of actions (e.g., creating complex documents).

A person who is using one type of computing device can be asked to supply personal information that is maintained by a personal information manager on another type of computing device. For example, suppose that a user attempts to access a password-controlled website on a desktop computer, and the user has the password for that website stored on a personal information manager on his or her smartphone. With current approaches, there is not an easy way for the user to retrieve the password from the personal information manager on the smartphone. At a minimum, the user would have to pick up his or her smartphone, navigate to and open the personal information manager, find the password associated with the desired website, and manually enter that password into a web browser on the desktop computer. This, however, is both inconvenient and prone to error. Accordingly, benefits may be realized by techniques that enable a personal information manager on one computing device to supply personal information to an application that is running on another computing device.

SUMMARY

In accordance with one aspect of the present disclosure, a method implemented by a first broker on a first computing device is disclosed. The method includes determining that an application on the first computing device has requested personal information. The personal information can be provided by a personal information manager on a second computing device. The first computing device operates using a first platform and the second computing device operates using a second platform. The second platform is different from the first platform. There is a trusted connection between the first computing device and the second computing device. The method further includes sending a request to a second broker on the second computing device to provide the personal information for the application. The request is sent automatically in response to determining that the application has requested the personal information. The method further includes receiving the personal information from the second broker on the second computing device and providing the personal information to the application.

The first computing device may include a desktop computer that runs a desktop operating system. The second computing device may include a mobile device that runs a mobile operating system.

Determining that the application on the first computing device has requested the personal information may include receiving an application programming interface (API) request from the application.

Determining that the application on the first computing device has requested the personal information may include detecting a system call made by the application.

Sending the request to the second computing device may include calling an application programming interface (API) that is exposed by a broker on the second computing device.

The personal information may include at least one of password information, address information, financial account information, account information for a customer loyalty program, and government identification information.

In accordance with another aspect of the present disclosure, a method is disclosed that includes receiving a request from a first computing device to provide personal information for a first application running on the first computing device. The request is received at a second computing device. The personal information can be provided by a personal information manager on the second computing device. The first computing device operates using a first platform and the second computing device operates using a second platform that is different from the first platform. There is a trusted connection between the first computing device and the second computing device. The method further includes obtaining the personal information from the personal information manager on the second computing device and sending the personal information to the first computing device.

Obtaining the personal information may include sending an application programming interface (API) request to an API that is exposed by the personal information manager.

Obtaining the personal information may include simulating that a second application on the second computing device is requesting the personal information.

Obtaining the personal information may include launching a second application on the second computing device. The second application may correspond to the first application on the first computing device. Obtaining the personal information may also include copying the personal information when the personal information manager provides the personal information to the second application.

The first computing device may include a desktop computer that runs a desktop operating system. The second computing device may include a mobile device that runs a mobile operating system.

In accordance with another aspect of the present disclosure, a system is disclosed that includes a first computing device that operates using a first platform, a first broker on the first computing device, and a second computing device that operates using a second platform. The second platform is different from the first platform. The system also includes a second broker on the second computing device and a personal information manager on the second computing device. The first broker and the second broker are configured to establish a trusted connection between the first computing device and the second computing device. The first broker is additionally configured to request personal information from the personal information manager via the second broker.

The first computing device may include a desktop computer that runs a desktop operating system. The second computing device may include a mobile device that runs a mobile operating system.

The system may further include an application on the first computing device. The first broker may be configured to automatically request the personal information in response to determining that the application has requested the personal information.

The first broker may be additionally configured to determine context information related to the personal information. The first broker may also be additionally configured to provide the context information to the personal information manager in connection with requesting the personal information.

The second broker may be configured to expose an application programming interface (API). The first broker may be configured to request the personal information from the personal information manager via an API request.

The second broker may be configured to obtain the personal information from the personal information manager on the second computing device and send the personal information to the first broker on the first computing device.

Obtaining the personal information may include sending an application programming interface (API) request to an API exposed by the personal information manager.

Obtaining the personal information may include simulating that an application on the second computing device is requesting the personal information.

The system may further include a first application on the first computing device. Obtaining the personal information may include launching a second application on the second computing device. The second application may correspond to the first application on the first computing device. Obtaining the personal information may also include copying the personal information when the personal information manager provides the personal information to the second application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

The techniques disclosed herein enable a personal information manager on one computing device to supply personal information to an application that is running on another computing device. As an example, the techniques disclosed herein can be implemented in a computing environment that includes a mobile device and a desktop computer. If an application on the desktop computer requests personal information, a personal information manager on the mobile device can be used to supply the personal information.

In general, the techniques disclosed herein can be implemented in any computing environment that includes at least two different computing devices, which may operate using different platforms. For example, the techniques disclosed herein can be implemented in a computing environment that includes a first computing device that operates using a first platform and a second computing device that operates using a second platform, where the second platform can be different from the first platform.

In this context, the term "platform" can describe a specific environment that includes a set of computer hardware and an operating system on which software is executed. For example, a first computing device may be said to run on a different platform than a second computing device if the first computing device includes a different set of hardware components than the second computing device. As another example, a first computing device may be said to run on a different platform than a second computing device if the first computing device includes a different operating system (either a different type of operating system or a different version of the same type of operating system) than the second computing device.

In some embodiments, the first computing device and the second computing device can be connected to each other so as to facilitate the simultaneous and collaborative use of computing resources among the computing devices. The computing devices can be owned by (or under the control of) the same user.

Figure 1:
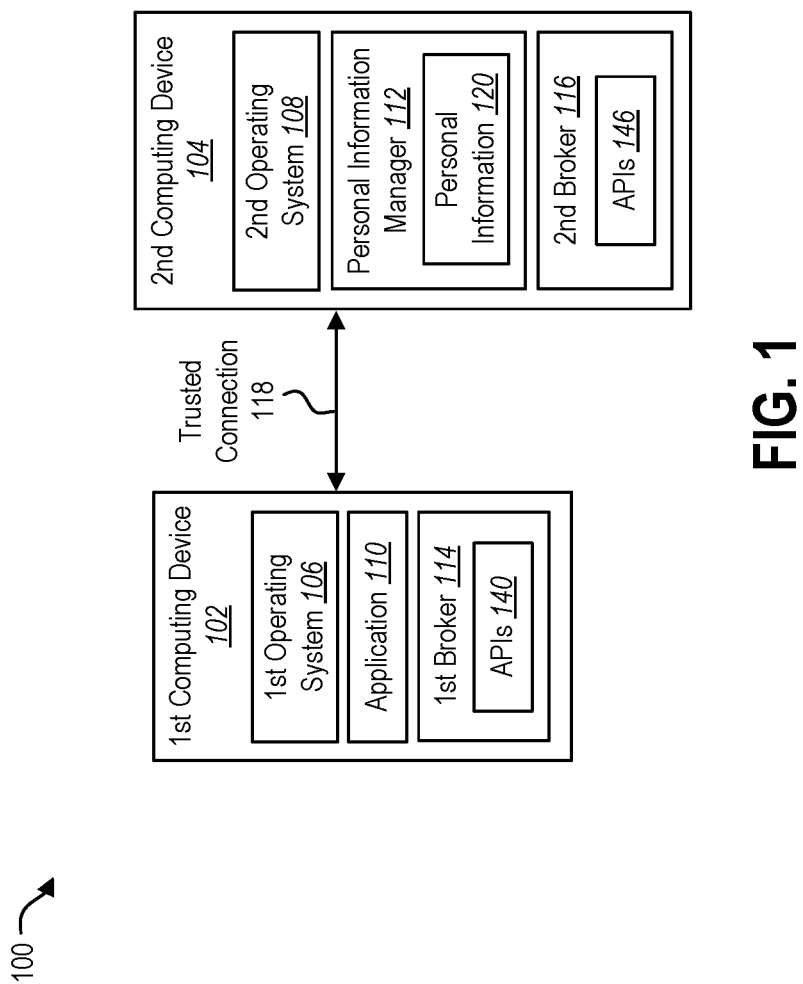
FIG. 1 illustrates an example of a system in which the techniques disclosed herein can be utilized, the system including a first broker on a first computing device and a second broker on a second computing device.

FIG. 1 illustrates an example of a system 100 in which the techniques disclosed herein can be utilized. The system 100 includes a first computing device 102 and a second computing device 104. The first computing device 102 and the second computing device 104 can be owned by (or under the control of) the same user. The first computing device 102 and the second computing device 104 can be client-type devices. Some examples of client-type devices include desktop computers, laptop computers, smartphones, tablet computers, smartwatches, virtual reality headsets, fitness trackers, and the like.

In some embodiments, the first computing device 102 and the second computing device 104 can operate using different platforms. For example, the first computing device 102 and the second computing device 104 can have different operating systems. FIG. 1 shows the first computing device 102 with a first operating system 106 and the second computing device 104 with a second operating system 108. In some embodiments, the first operating system 106 can be a different type of operating system than the second operating system 108. Alternatively, the first operating system 106 and the second operating system 108 can be different versions of the same type of operating system.

In some embodiments, the first computing device 102 and the second computing device 104 can be different types of computing devices. For example, the first computing device 102 can be a desktop computer running a desktop operating system (e.g., Microsoft Windows®, Linux®) and the second computing device 104 can be a mobile device running a mobile operating system (e.g., Android®, iOS®).

The first computing device 102 includes an application 110. The application 110 can be any kind of software that is designed to perform a group of coordinated functions, tasks, or activities for the benefit of a user of the first computing device 102. In some embodiments, the application 110 can be a standalone application (e.g., a word processor, a spreadsheet, an email client, a media player, a photo editor). Alternatively, the application 110 can be a web browser, which is a software application for accessing information on the World Wide Web.

In some situations, the application 110 on the first computing device 102 can request the user to provide personal information 120. The user may have the requested personal information 120 stored on the second computing device 104. For example, a personal information manager 112 on the second computing device 104 may have the requested personal information 120. With current approaches, however, there is not an easy way for the user to retrieve the password from the personal information manager 112 on the second computing device 104. Advantageously, in accordance with the techniques disclosed herein, the personal information manager 112 on the second computing device 104 can provide the requested personal information 120 to the application 110 on the first computing device 102.

To enable this to occur, the first computing device 102 includes a first broker 114 and the second computing device 104 includes a second broker 116. The first broker 114 and the second broker 116 can work together to obtain the requested personal information 120 from the personal information manager 112. For example, the first broker 114 can send a request to the second broker 116 to provide the requested personal information 120. The second broker 116 can then obtain the requested personal information 120 from the personal information manager 112 and return the personal information 120 to the first broker 114. The first broker 114 can then provide the personal information 120 to the application 110.

The first computing device 102 and the second computing device 104 can be connected to each other both physically and logically. The physical connection between the first computing device 102 and the second computing device 104 can be a wired connection or a wireless connection. The logical connection between the first computing device 102 and the second computing device 104 can be facilitated by the first broker 114 and the second broker 116. The first broker 114 and the second broker 116 can facilitate the simultaneous and collaborative use of computing resources among the first computing device 102 and the second computing device 104.

Various capabilities of the first computing device 102 can be exposed to the second computing device 104, and vice versa. For example, the first broker 114 on the first computing device 102 can expose one or more application programming interfaces (APIs) 140, and those APIs 140 can be known to the second broker 116 on the second computing device 104. The APIs 140 exposed by the first broker 114 can enable entities on the second computing device 104 to interact with software and/or hardware on the first computing device 102. Similarly, the second broker 116 on the second computing device 104 can expose one or more APIs 146, and those APIs 146 can be known to the first broker 114 on the first computing device 102. The APIs 146 exposed by the second broker 116 can enable entities on the first computing device 102 to interact with software and/or hardware on the second computing device 104.

FIG. 1 shows a trusted connection 118 between the first computing device 102 and the second computing device 104. The first broker 114 and the second broker 116 can communicate with each other in order to establish this trusted connection 118. The existence of this trusted connection 118 means that sensitive information, such as the personal information 120, can be exchanged between the first computing device 102 and the second computing device 104.

FIG. 1 shows the first operating system 106, the application 110, and the first broker 114 as separate components. In some embodiments, however, the first broker 114 can be integrated with the first operating system 106. For example, the first broker 114 can be part of the first operating system 106. Alternatively, in some embodiments the first broker 114 can be integrated with the application 110. For example, the first broker 114 can be part of the application 110.

FIG. 1 also shows the personal information manager 112 and the second operating system 108 as separate components. In some embodiments, however, the personal information manager 112 can be integrated with the second operating system 108. For example, the personal information manager 112 can be part of the second operating system 108.

In some embodiments, the first operating system 106 can be created by or under the control of a first entity (e.g., a first company), while the second operating system 108 and the personal information manager 112 can be created by or under the control of a second entity (e.g., a second company). The first entity can be different from the second entity. Thus, the first entity may not have any ability to modify the second operating system 108 or the personal information manager 112. Notwithstanding this limitation, the first entity can create the first broker 114 and the second broker 116 to enable the personal information 120 that is maintained by the person information manager 112 to be provided to the application 110 on the first computing device 102.

Figure 2:
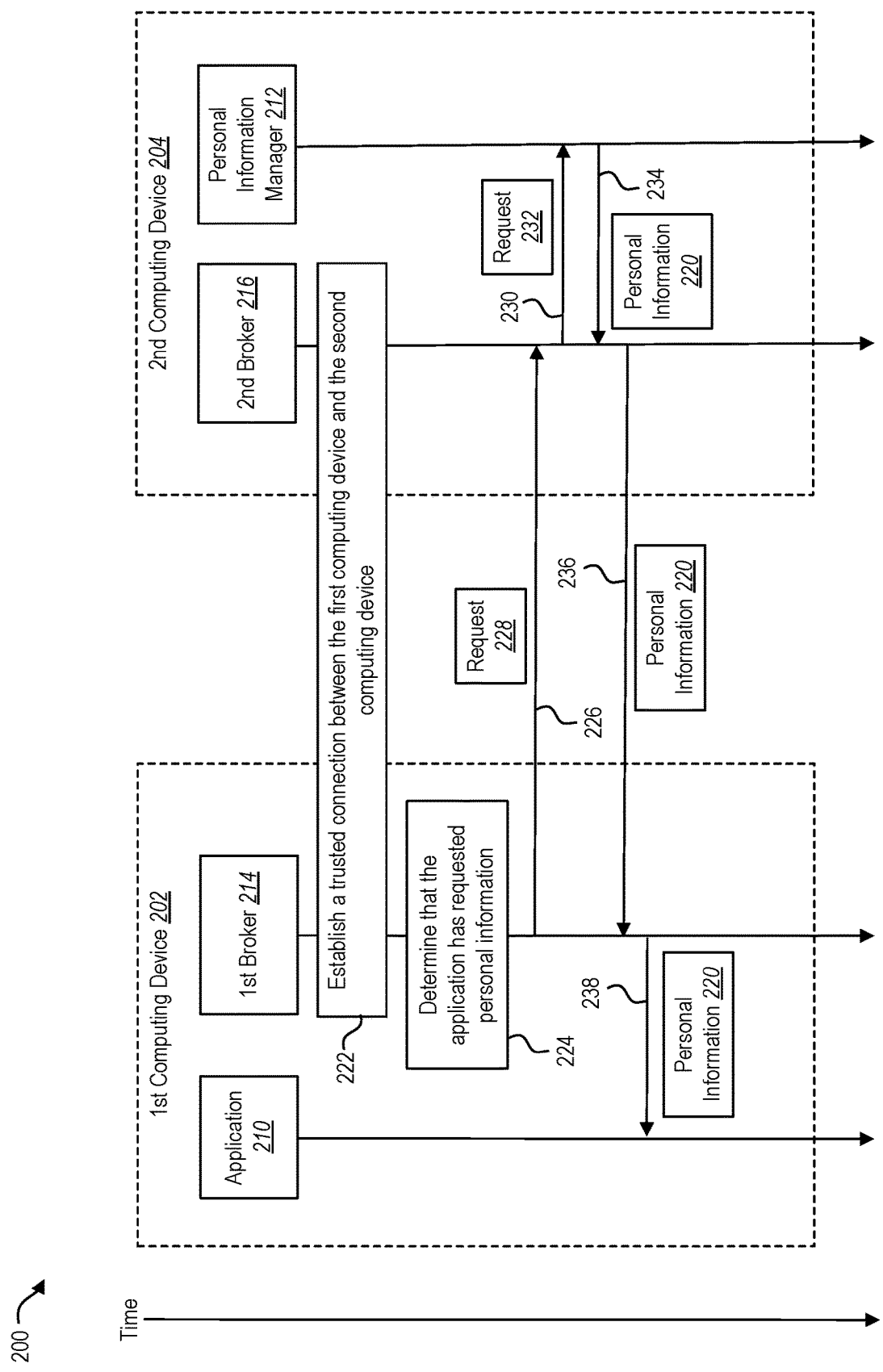
FIG. 2 illustrates an example of a method that can be implemented by a first computing device and a second computing device to facilitate personal information that is maintained by a personal information manager on the second computing device to be provided to an application on the first computing device.

FIG. 2 illustrates an example of a method 200 that can be implemented by a first computing device 202 and a second computing device 204 in accordance with the present disclosure. The first computing device 202 and the second computing device 204 are examples of the first computing device 102 and the second computing device 104 in the system 100 shown in FIG. 1. The method 200 can enable personal information 220 that is maintained by a personal information manager 212 on the second computing device 204 to be provided to an application 210 on the first computing device 202.

More specifically, in accordance with the method 200, a first broker 214 on the first computing device 202 and a second broker 216 on the second computing device 204 can work together in order to establish 222 a trusted connection (such as the trusted connection 118 shown in FIG. 1) between the first computing device 202 and the second computing device 204. In some embodiments, establishing 222 the trusted connection can include requiring the user to provide identifying information to both the first computing device 202 and the second computing device 204. The user can also be required to prove that the user owns both devices 202, 204 and is in possession of both devices 202, 204.

At some point, it can be beneficial for the application 210 on the first computing device 202 to obtain personal information 220. The first broker 214 on the first computing device 202 can determine 224 when the application 210 has requested personal information 220. In some embodiments, the application 210 can take some action to indicate that it is requesting personal information 220. For example, in some embodiments the application 210 can request the user to provide personal information 220, and the first broker 214 can detect that such a request has occurred. As another example, the application 210 can communicate directly with the first broker 214 to indicate that the application 210 is requesting personal information 220. As another example, the application 210 can take some action that does not involve directly communicating with the first broker 214 (e.g., making a system call) to indicate that the application 210 is requesting personal information 220, and this action can be detected by the first broker 214.

In response to determining 224 that the application 210 has requested personal information 220, the first broker 214 can send 226 a request 228 for the personal information 220 to the second broker 216 on the second computing device 204. The request 228 (as well as other communications between the first broker 214 and the second broker 216) can be sent via a secure communication channel that has been established between the first computing device 202 and the second computing device 204.

In response to receiving the request 228 from the first broker 214, the second broker 216 can obtain the personal information 220 from the personal information manager 212 on the second computing device 204. For example, the second broker 216 can send 230 a request 232 for the personal information 220 to the personal information manager 212. In some embodiments, the second broker 216 can send 230 the request 232 directly to the personal information manager 212. Alternatively, in other embodiments the second broker 216 can take some action that does not involve directly communicating with the personal information manager 212 (e.g., making a system call), and this action can cause the personal information manager 212 to provide the personal information 220.

In response to receiving the request 232 from the second broker 216, the personal information manager 212 can provide 234 the requested personal information 220 to the second broker 216. The second broker 216 can then send 236 the personal information 220 back to the first broker 214 on the first computing device 102, and the first broker 214 can provide 238 the personal information 220 to the application 210.

The application 210 can then use the personal information 220. As an example, if the application 210 is a web browser and the user is trying to access a particular website, the personal information 220 can include a password for the website. Once the web browser 210 receives the password, the user can be logged on to the web site.

Advantageously, the personal information 220 can be obtained automatically. In some embodiments, once the first broker 214 determines that the application 210 needs personal information 220, the first broker 214 and the second broker 216 can work together to obtain the personal information 220 for the website without additional user input.

Figure 3:
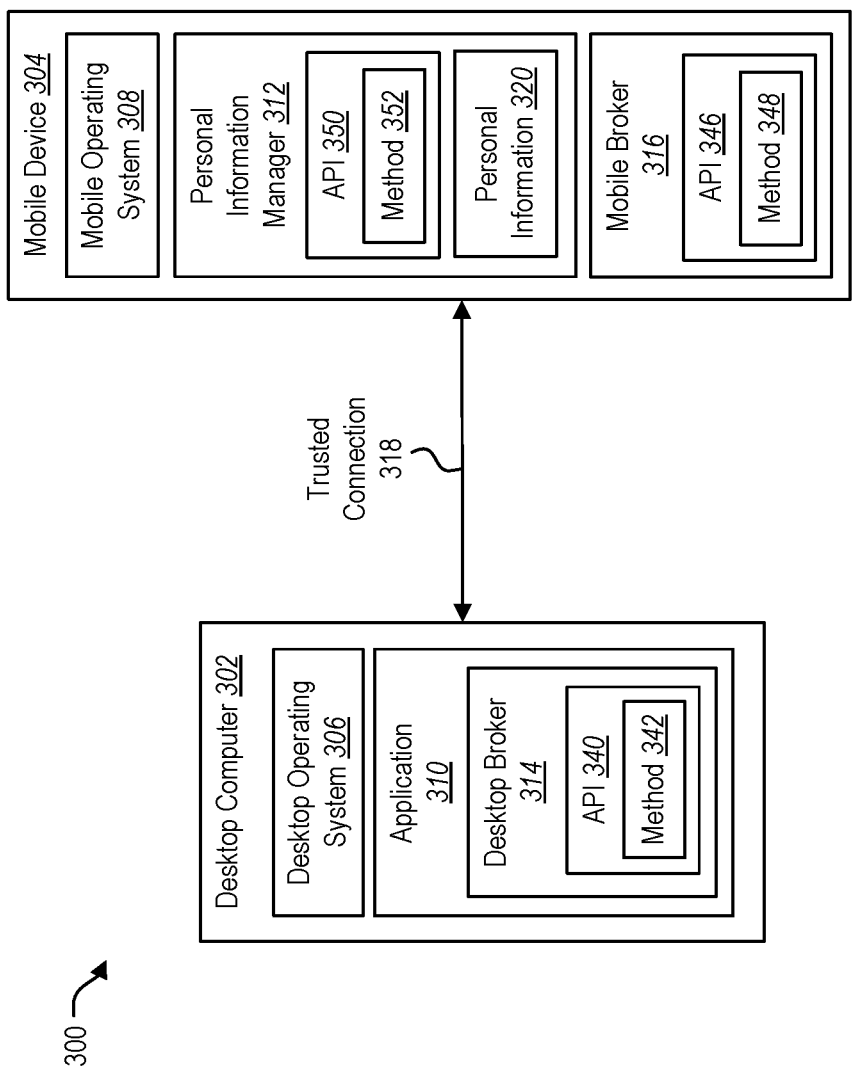
FIG. 3 illustrates an example of a system in which the techniques disclosed herein can be utilized, the system including a desktop broker on a desktop computer and a mobile broker on a mobile device.

FIG. 3 illustrates another example of a system 300 in which the techniques disclosed herein can be utilized. The system 300 shown in FIG. 3 is similar to the system 100 shown in FIG. 1, except as indicated below.

As in the system 100 shown in FIG. 1, the system 300 shown in FIG. 3 includes a first computing device and a second computing device. In the system 300 shown in FIG. 3, however, the first computing device is a desktop computer 302 running a desktop operating system 306 (e.g., Microsoft Windows®, Linux®), and the second computing device is a mobile device 304 running a mobile operating system 308 (e.g., Android®, iOS®).

As in the system 100 shown in FIG. 1, the computing devices in the system 300 shown in FIG. 3 both include a broker. In particular, the desktop computer 302 includes a broker 314, which may be referred to herein as a desktop broker 314. The mobile device 304 includes a broker 316, which may be referred to herein as a mobile broker 316. The desktop broker 314 and the mobile broker 316 can work together in order to establish a trusted connection 318 between the desktop computer 302 and the mobile device 304.

In the system 300 shown in FIG. 3, the desktop broker 314 is integrated with the application 310 on the desktop computer 302. In some embodiments, the desktop broker 314 can be part of the application 310. In other embodiments, the desktop broker 314 can be distinct from the application 310, but the application 310 can be aware of the desktop broker 314.

The system 300 shown in FIG. 3 also includes various APIs. For example, the desktop broker 314 can expose an application programming interface (API) 340, and this API 340 can be known to the application 310. The API 340 can include a method 342 that, when invoked, causes the desktop broker 314 to initiate the process of obtaining personal information 320 from the personal information manager 312 by interacting with the mobile broker 316. When it would be beneficial for the application 310 to obtain personal information 320 that is stored on the mobile device 304, the application 310 can call the API 340 exposed by the desktop broker 314 and invoke the method 342.

The mobile broker 316 can also expose an API 346, and this API 346 can be known to the desktop broker 314. The API 346 can include a method 348 that, when invoked, causes the mobile broker 316 to obtain the personal information 320 from the personal information manager 312. In response to the application 310 calling the API 340 and invoking the method 342, the desktop broker 314 can call the API 346 exposed by the mobile broker 316 and invoke the method 348.

In addition, the personal information manager 312 can also expose an API 350, and this API 350 can be known to the mobile broker 316. The API 350 can include a method 352 that, when invoked, causes the personal information manager 312 to return personal information 320. In response to the desktop broker 314 calling the API 346 and invoking the method 348, the mobile broker 316 can call the API 350 exposed by the personal information manager 312 and invoke the method 352.

Figure 4:
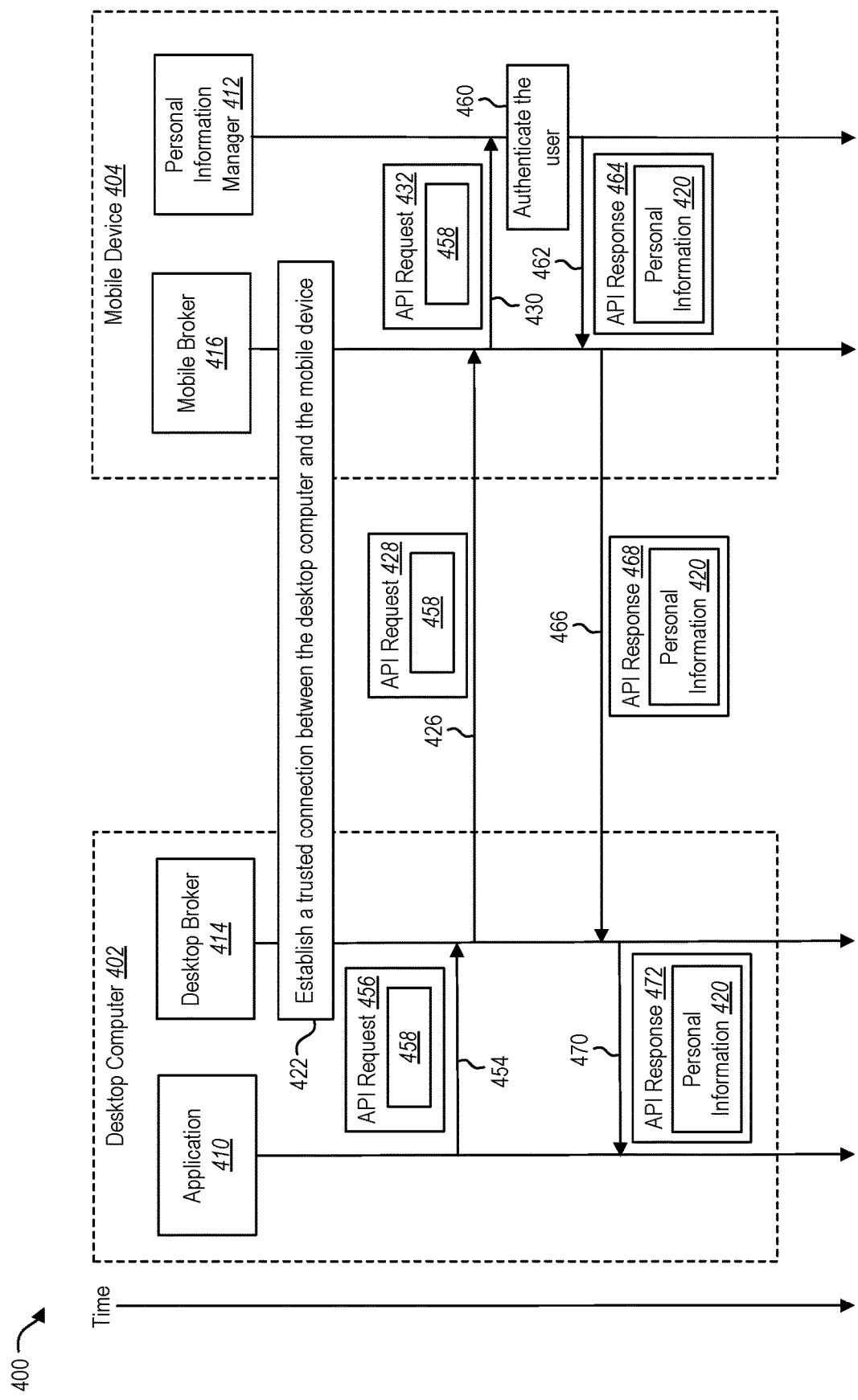
FIG. 4 illustrates an example of a method that can be implemented by a desktop computer and a mobile device in accordance with the present disclosure to facilitate personal information that is maintained by a personal information manager on the mobile device to be provided to an application on the desktop computer.

FIG. 4 illustrates an example of a method 400 that can be implemented by a desktop computer 402 and a mobile device 404 in accordance with the present disclosure. The desktop computer 402 and the mobile device 404 are examples of the desktop computer 302 and the mobile device 304 in the system 300 shown in FIG. 3.

In accordance with the method 400, a desktop broker 414 on the desktop computer 402 and a mobile broker 416 on the mobile device 404 can communicate with each other in order to establish 422 a trusted connection (such as the trusted connection 318 shown in FIG. 3) between the desktop computer 402 and the mobile device 404.

When it is beneficial for an application 410 on the desktop computer 402 to obtain personal information 420, the application 410 can communicate with the desktop broker 414 and indicate that the application 410 is requesting personal information 420. In the depicted example, the application 410 calls an API that is exposed by the desktop broker 414 (e.g., the API 340 in FIG. 3) and invokes a method (e.g., the method 342 in FIG. 3) that causes the desktop broker 414 to initiate the process of obtaining personal information 420 from the personal information manager 412 by interacting with the mobile broker 416. FIG. 4 shows the application 410 sending 454 an API request 456 to the desktop broker 414.

The desktop broker 414 receiving the API request 456 from the application 410 is one example of determining when the application 410 has requested personal information 420. In other words, the desktop broker 414 receiving the API request 456 from the application 410 provides one example of the action of determining 224 in the method 200 shown in FIG. 2.

The API request 456 can include context information 458 related to the personal information 420 that is desired from the personal information manager 412. The context information 458 can include information about the entity that is requesting the personal information 420. The context information 458 can also indicate the type of personal information 420 that is being requested. In some embodiments, the context information 458 can also include information about how the user was authenticated to the application 410. Some examples of context information 458 will be discussed below.

In response to receiving the API request 456 from the application 410, the desktop broker 414 can call an API that is exposed by the mobile broker 416 (e.g., the API 346 in FIG. 3) and invoke a method (e.g., the method 348 in FIG. 3) that causes the mobile broker 416 to obtain the personal information 420 from the personal information manager 412. FIG. 4 shows the desktop broker 414 sending 426 an API request 428 to the mobile broker 416. The API request 428 is one example of the request 228 shown in FIG. 2. The API request 428 can include some or all of the context information 458 that may be included in the API request 456 from the application 410.

In response to receiving the API request 428 from the desktop broker 414, the mobile broker 416 can call an API that is exposed by the personal information manager 412 (e.g., the API 350 in FIG. 3) and invoke a method (e.g., the method 352 in FIG. 3) that causes the personal information manager 412 to provide the requested personal information 420. FIG. 4 shows the mobile broker 416 sending 430 an API request 432 to the personal information manager 412. The API request 432 is one example of the request 232 shown in FIG. 2. The API request 432 can include some or all of the context information 458 that may be included in the API request 456 from the application 410 and the API request 428 from the desktop broker 414.

In some embodiments, in response to receiving the API request 432 from the mobile broker 416, the personal information manager 412 can authenticate 460 the user. For example, the personal information manager 412 can require the user to provide appropriate user credentials via a user input device of the mobile device 404. As another example, the personal information manager 412 can require the user to perform authentication via a biometric authentication mechanism (e.g., fingerprint identification, facial recognition). In some embodiments, the authentication 460 performed by the personal information manager 412 can be in addition to whatever authentication is performed to establish 422 a trusted connection between the desktop computer 402 and the mobile device 404.

If the user is successfully authenticated, then the personal information manager 412 can respond to the API request 432 sent by the mobile broker 416. FIG. 4 shows the personal information manager 412 sending 462 the mobile broker 416 an API response 464 that includes the requested personal information 420. As indicated above, the API request 432 can include context information 458. The personal information manager 412 can use the context information 458 to determine what personal information 420 should be provided in response to the API request 432. For example, if the application 410 is a web browser and the user of the desktop computer 402 needs a password in order to access a particular website, the context information 458 can identify the website and can indicate that a password is needed for the website. The personal information manager 412 can use this information to identify the appropriate password and return it as part of the personal information 420.

When the mobile broker 416 receives the API response 464 from the personal information manager 412, the mobile broker 416 can respond to the API request 428 sent by the desktop broker 414. FIG. 4 shows the mobile broker 416 sending 466 the desktop broker 414 an API response 468 that includes the personal information 420 received from the personal information manager 412.

When the desktop broker 414 receives the API response 468 from the mobile broker 416, the desktop broker 414 can respond to the API request 456 sent by the application 410. FIG. 4 shows the desktop broker 414 sending 470 the application 410 an API response 472 that includes the personal information 420 received from the mobile broker 416.

Figure 5:
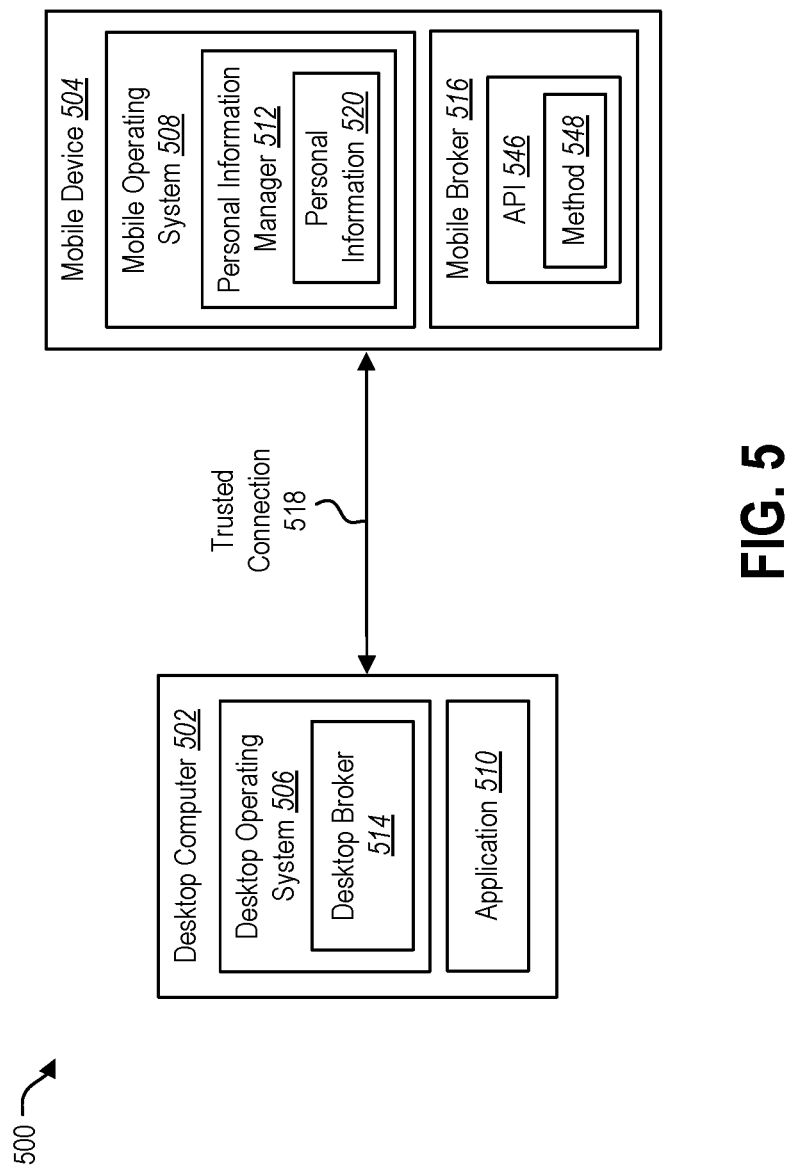
FIG. 5 illustrates another example of a system in which the techniques disclosed herein can be utilized, the system including a desktop broker that is integrated with an operating system on a desktop computer and a personal information manager that is integrated with an operating system on a mobile device.

FIG. 5 illustrates another example of a system 500 in which the techniques disclosed herein can be utilized. The system 500 shown in FIG. 5 is similar to the system 300 shown in FIG. 3, except as indicated below.

As in the system 300 shown in FIG. 3, the system 500 shown in FIG. 5 includes a desktop computer 502 running a desktop operating system 506 and a mobile device 504 running a mobile operating system 508. The desktop computer 502 includes a desktop broker 514, and the mobile device 504 includes a mobile broker 516. The desktop broker 514 and the mobile broker 516 can work together in order to establish a trusted connection 518 between the desktop computer 502 and the mobile device 504.

In the system 500 shown in FIG. 5, the desktop broker 514 is integrated with the desktop operating system 506. In some embodiments, the desktop broker 514 can be part of the desktop operating system 506.

As in the system 300 shown in FIG. 3, the desktop broker 514 and the mobile broker 516 can communicate with each other in order to enable a personal information manager 512 on the mobile device 504 to provide personal information 520 to an application 510 on the desktop computer 502. In the system 500 shown in FIG. 5, however, the application 510 may not be aware of the desktop broker 514. When it would be beneficial for the application 510 to obtain personal information 520, the application 510 can make a system call to the desktop operating system 506 that is relevant to obtaining personal information 520. For example, the application 510 can make a system call to the desktop operating system 506 that would cause a dialog box to be displayed to allow the user to enter personal information 520. Because the desktop broker 514 is integrated with the desktop operating system 506, the desktop broker 514 can detect system calls that are relevant to obtaining personal information 520. When the desktop broker 514 detects this type of system call, the desktop broker 514 can initiate the process of obtaining personal information 520 from the personal information manager 512 by interacting with the mobile broker 516.

As in the system 300 shown in FIG. 3, the mobile broker 516 can expose an API 546, and this API 546 can be known to the desktop broker 514. The API 546 can include a method 548 that, when invoked, causes the mobile broker 516 to obtain the personal information 520 from the personal information manager 512.

In the system 500 shown in FIG. 5, however, the personal information manager 512 can be integrated with the mobile operating system 508. In some embodiments, the personal information manager 512 can be part of the mobile operating system 508. In order to obtain personal information 520 from the personal information manager 512, the mobile broker 516 can make a system call to the mobile operating system 508. For example, the mobile broker 516 can act as if it is an application running on the mobile device 504 and invoke the personal information manager 512 via a system call.

Figure 6:
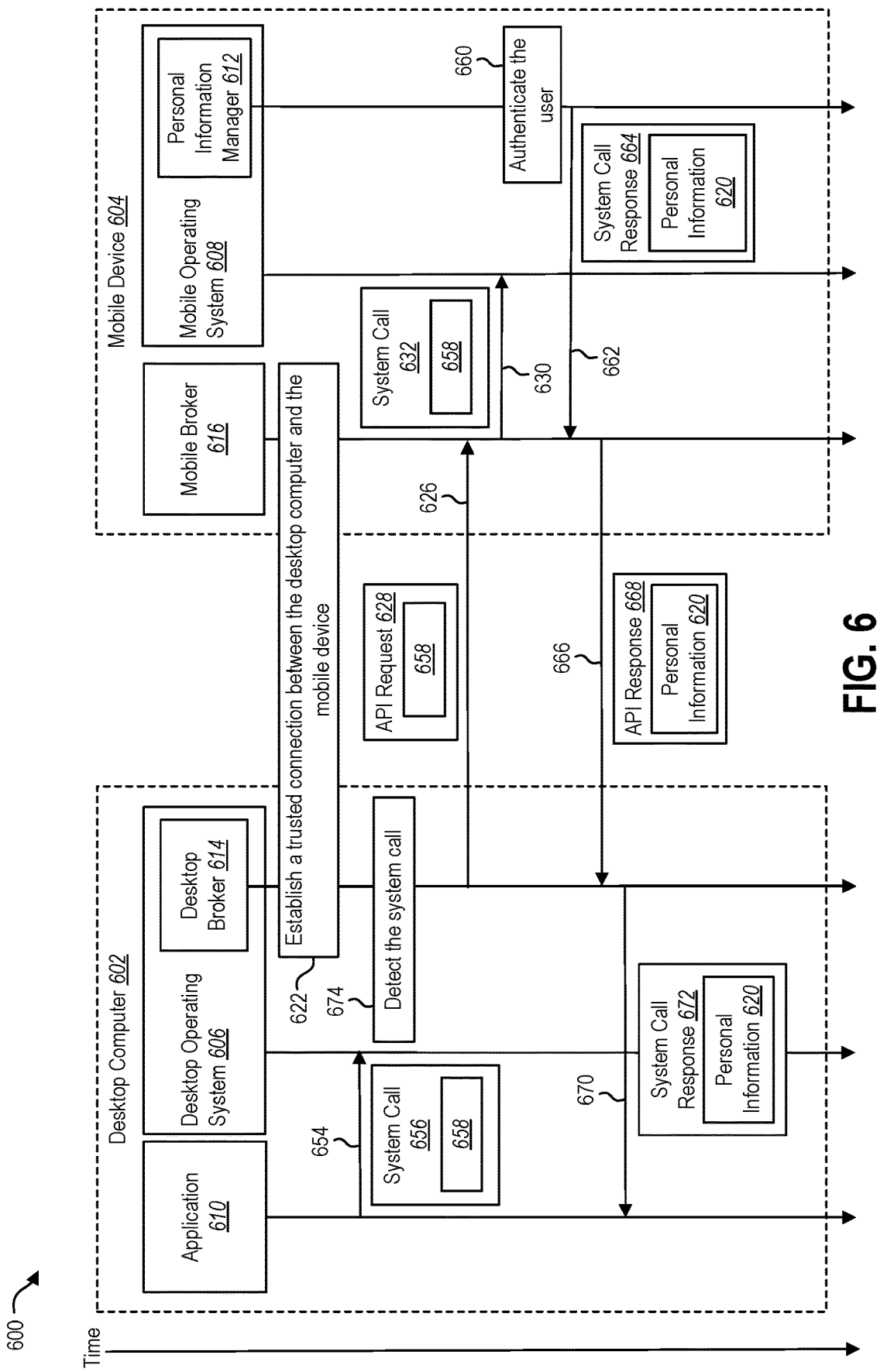
FIG. 6 illustrates another example of a method that can be implemented by a desktop computer and a mobile device in accordance with the present disclosure, the method including a desktop broker detecting a system call made by an application on the desktop computer.

FIG. 6 illustrates an example of a method 600 that can be implemented by a desktop computer 602 and a mobile device 604 in accordance with the present disclosure. The desktop computer 602 and the mobile device 604 are examples of the desktop computer 502 and the mobile device 504 in the system 500 shown in FIG. 5.

In accordance with the method 600, a desktop broker 614 on the desktop computer 602 and a mobile broker 616 on the mobile device 604 can work together in order to establish 622 a trusted connection (such as the trusted connection 518 shown in FIG. 5) between the desktop computer 602 and the mobile device 604.

In the depicted example, when it is beneficial for an application 610 on the desktop computer 602 to obtain personal information 620, the application 610 can make 654 a system call 656 to the desktop operating system 606 that is relevant to obtaining personal information 620. For example, the system call 656 can invoke a method that would cause a dialog box to be displayed to allow the user to enter personal information 620. The system call 656 can include context information 658 related to the personal information 620 that is desired. Because the desktop broker 614 is integrated with the desktop operating system 606, the desktop broker 614 is able to detect 674 the system call 656.

The desktop broker 614 detecting 674 the system call 656 is another example of determining when the application 610 has requested personal information 620. In other words, the desktop broker 614 detecting 674 the system call 656 provides another example of the action of determining 224 in the method 200 shown in FIG. 2.

In response to detecting 674 the system call 656, the desktop broker 614 can call an API that is exposed by the mobile broker 616 (e.g., the API 546 in FIG. 5) and invoke a method (e.g., the method 548 in FIG. 5) that causes the mobile broker 616 to obtain the personal information 620 from the personal information manager 612. FIG. 6 shows the desktop broker 614 sending 626 an API request 628 to the mobile broker 616. The API request 628 is another example of the request 228 shown in FIG. 2. The API request 628 can include some or all of the context information 658 that may be included in the system call 656 from the application 610.

In response to receiving the API request 628 from the desktop broker 614, the mobile broker 616 can make 630 a system call 632 to the mobile operating system 608. For example, the mobile broker 616 can act as if it is an application running on the mobile device 604 and invoke the personal information manager 612 via a system call 632. The system call 632 can include some or all of the context information 658 that may be included in the system call 656 from the application 610 and the API request 628 from the desktop broker 614.

In response to the system call 632 invoking the personal information manager 612, the personal information manager 612 can authenticate 660 the user. This authentication 660 can be similar to the authentication 460 shown in FIG. 4. If the user is successfully authenticated, then the personal information manager 612 can respond to the system call 632 made by the mobile broker 616. FIG. 6 shows the personal information manager 612 sending 662 the mobile broker 616 a system call response 664 that includes the requested personal information 620.

When the mobile broker 616 receives the system call response 664 from the personal information manager 612, the mobile broker 616 can respond to the API request 628 sent by the desktop broker 614. FIG. 6 shows the mobile broker 616 sending 666 the desktop broker 614 an API response 668 that includes the personal information 620 received from the personal information manager 612.

When the desktop broker 614 receives the API response 668 from the mobile broker 616, the desktop broker 614 can respond to the system call 656 made by the application 610. FIG. 6 shows the desktop broker 614 sending 670 the application 610 a system call response 672 that includes the personal information 620 received from the mobile broker 616.

Figure 7:
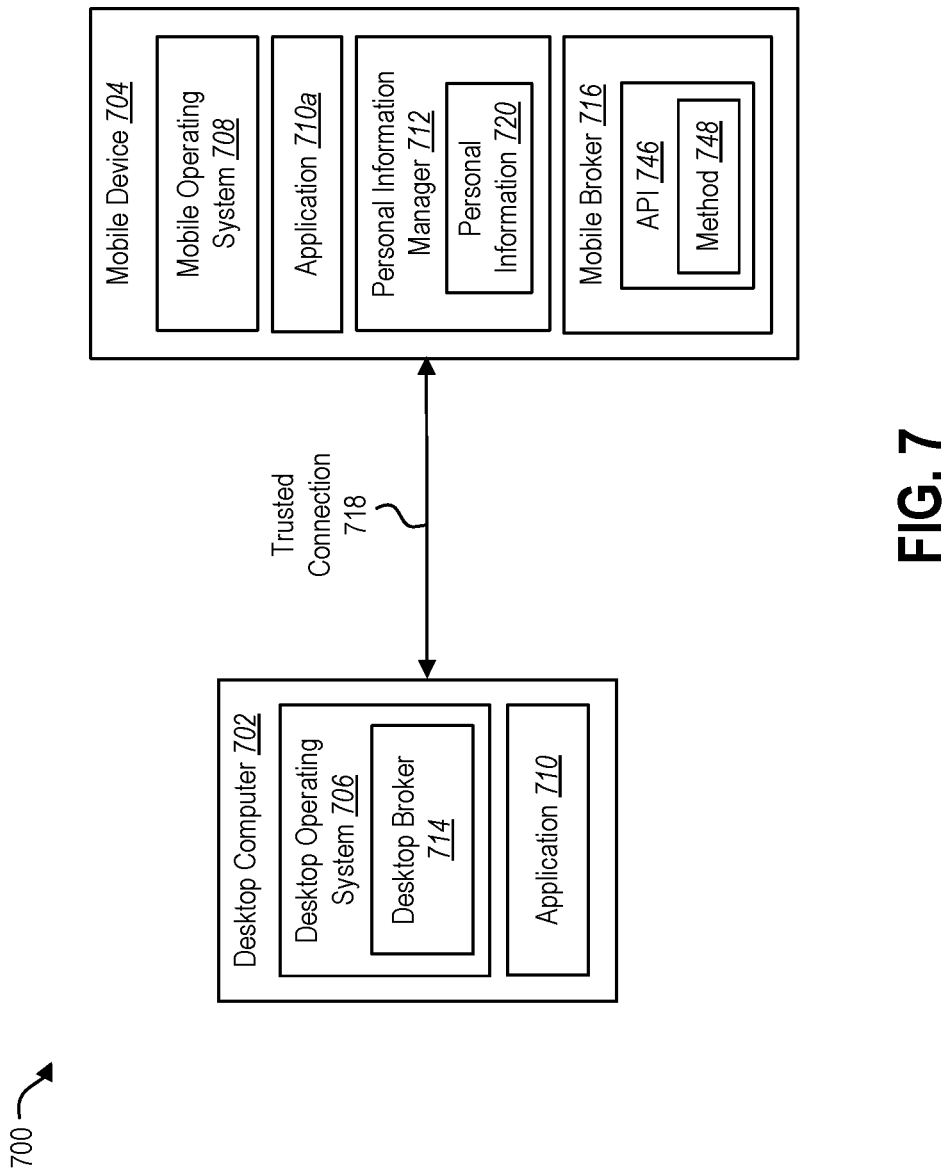
FIG. 7 illustrates another example of a system in which the techniques disclosed herein can be utilized, the system including a personal information manager that is distinct from an operating system on a mobile device.

FIG. 7 illustrates another example of a system 700 in which the techniques disclosed herein can be utilized. The system 700 shown in FIG. 7 is similar to the system 500 shown in FIG. 5, except as indicated below.

As in the system 500 shown in FIG. 5, the system 700 shown in FIG. 7 includes a desktop computer 702 running a desktop operating system 706 and a mobile device 704 running a mobile operating system 708. The desktop computer 702 includes a desktop broker 714, and the mobile device 704 includes a mobile broker 716. The desktop broker 714 and the mobile broker 716 can work together in order to establish a trusted connection 718 between the desktop computer 702 and the mobile device 704.

The desktop broker 714 can be integrated with the desktop operating system 706, as shown in FIG. 7. Alternatively, the desktop broker 714 can be distinct from the desktop operating system 706 (as, for example, in the system 300 shown in FIG. 3).

As in the system 500 shown in FIG. 5, when it would be beneficial for the application 710 to obtain personal information 720, the desktop broker 714 can initiate the process of obtaining the personal information 720 from a personal information manager 712 on the mobile device 704 by interacting with the mobile broker 716. The mobile broker 716 can expose an API 746, and this API 746 can be known to the desktop broker 714. The API 746 can include a method 748 that, when invoked, causes the mobile broker 716 to obtain the personal information 720 from the personal information manager 712.

In the system 700 shown in FIG. 7, however, the mobile broker 716 can obtain the personal information 720 by interacting with a corresponding application 710a on the mobile device 704. In other words, the mobile broker 716 can obtain the personal information 720 by causing an application 710a that is similar to the application 710 that is already running on the desktop computer 702 to be launched on the mobile device 704. For example, if the application 710 on the desktop computer 702 is a web browser and the user is trying to access a particular website, the mobile broker 716 can cause a web browser to be launched on the mobile device 704. Once the web browser has been launched, the mobile broker 716 can cause the web browser to navigate to the same website that the user is attempting to access on the desktop computer 702. If the personal information manager 712 has personal information 720 (e.g., a username and password) for the website, then the act of navigating to the website can cause the personal information manager 712 to automatically provide the personal information 720 to the web browser. The mobile broker 716 can then copy this personal information 720 and send it back to the desktop broker 714, which can then provide the personal information 720 to the application 710 on the desktop computer 702.

Figure 8:
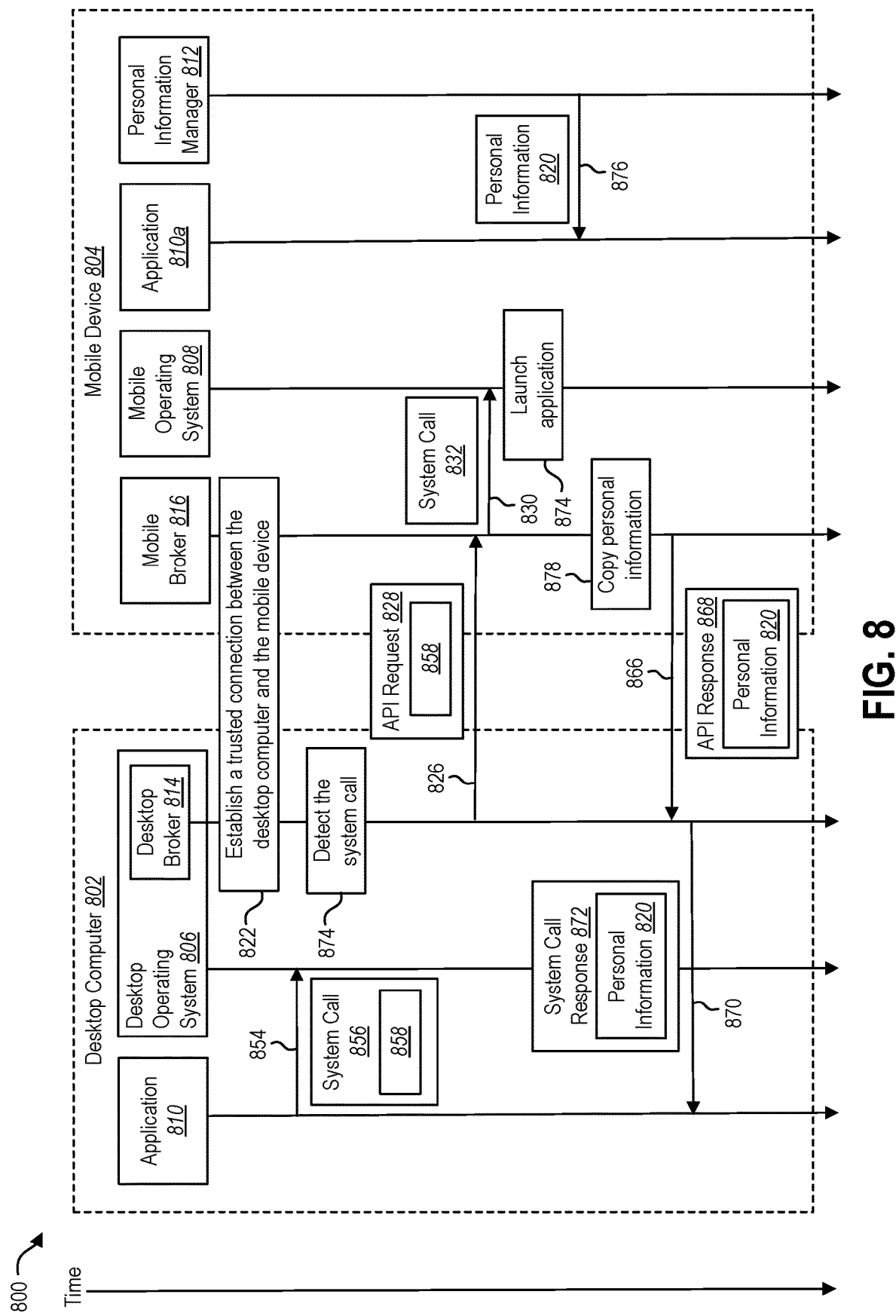
FIG. 8 illustrates another example of a method that can be implemented by a desktop computer and a mobile device in accordance with the present disclosure, the method including a mobile broker causing an application to be launched on the mobile device and then copying personal information when it is provided to the application.

FIG. 8 illustrates an example of a method 800 that can be implemented by a desktop computer 802 and a mobile device 804 in accordance with the present disclosure. The desktop computer 802 and the mobile device 804 are examples of the desktop computer 702 and the mobile device 704 in the system 700 shown in FIG. 7.

In accordance with the method 800, a desktop broker 814 on the desktop computer 802 and a mobile broker 816 on the mobile device 804 can work together in order to establish 822 a trusted connection (such as the trusted connection 718 shown in FIG. 7) between the desktop computer 802 and the mobile device 804.

When it would be beneficial for an application 810 on the desktop computer 802 to obtain personal information 820, the application 810 can make 854 a system call 856 to the desktop operating system 806. The system call 856 can include context information 858 related to the personal information 820 that is desired.

Because the desktop broker 814 is integrated with the desktop operating system 806, the desktop broker 814 is able to detect 874 the system call 856. In response, the desktop broker 814 can call an API that is exposed by the mobile broker 816 (e.g., the API 746 in FIG. 7) and invoke a method (e.g., the method 748 in FIG. 7) that causes the mobile broker 816 to obtain the personal information 820 from the personal information manager 812. FIG. 8 shows the desktop broker 814 sending 826 an API request 828 to the mobile broker 816. The API request 828 is another example of the request 228 shown in FIG. 2. The API request 828 can include some or all of the context information 858 that may be included in the system call 856 from the application 810.

In response to receiving the API request 828 from the desktop broker 814, the mobile broker 816 can perform one or more actions that have the effect of causing an application 810*a* that is similar to the application 810 that is already running on the desktop computer 802 to be launched on the mobile device 804. For example, as shown in FIG. 8, the mobile broker 816 can make 830 a system call 832 to the mobile operating system 808. The system call 832 can have the effect of causing the mobile operating system 808 to launch 874 the application 810*a*. The mobile broker 816 can determine the identity of the application 810 (and therefore the identity of the application 810*a* to be launched on the mobile device 804) from the context information 858 in the API request 828 that is received from the desktop broker 814.

Once the application 810*a* has been launched, the personal information manager 812 can automatically provide 876 personal information 820 to the application 810*a*. For example, if the application 810 on the desktop computer 802 is a web browser and the requested personal information 820 is going to be used for a website that the user is trying to access, the application 810*a* that is launched 874 on the mobile device 804 can also be a web browser. Once the web browser has been launched 874, the mobile broker 816 can cause the web browser to navigate to the same website that the user is attempting to access on the desktop computer 802, as determined from the context information 858. If the personal information manager 812 has personal information 820 (e.g., a username and password) for the website, then the act of navigating to the website can cause the personal information manager 812 to automatically provide 876 the personal information 820 to the web browser.

The mobile broker 816 can copy 878 the personal information 820 that the personal information manager 812 provides 876 to the application 810*a*. For example, if a user interface of the application 810*a* includes one or more input fields and the personal information manager 812 automatically fills in the input field(s) with personal information 820, the mobile broker 816 can copy 878 the personal information 820 from the input field(s).

Once the mobile broker 816 has copied 878 the personal information 820 from the application 810*a*, the mobile broker 816 can respond to the API request 828 sent by the desktop broker 814. FIG. 8 shows the mobile broker 816 sending 866 the desktop broker 814 an API response 868 that includes the personal information 820 that the mobile broker 816 copied from the application 810*a*.

When the desktop broker 814 receives the API response 868 from the mobile broker 816, the desktop broker 814 can respond to the system call 856 made by the application 810. FIG. 8 shows the desktop broker 814 sending 870 the application 810 a system call response 872 that includes the personal information 820 received from the mobile broker 816.

In the examples shown in FIGS. 3-8, a personal information manager on a mobile device supplies personal information to an application running on a desktop computer. However, the techniques disclosed herein are also applicable to facilitate the opposite type of interaction, where a personal information manager on a desktop computer supplies personal information to an application running on a mobile device. The techniques disclosed herein are also applicable to facilitate a similar interaction between a desktop computer and another type of computing device other than a mobile device, between a mobile device and another type of computing device other than a desktop computer, or between two other types of computing devices. In general terms, the techniques disclosed herein permit a personal information manager that is running on a first computing device to supply personal information to an application running on a second computing device. The first computing device and the second computing device can operate using different platforms.

Figure 9:
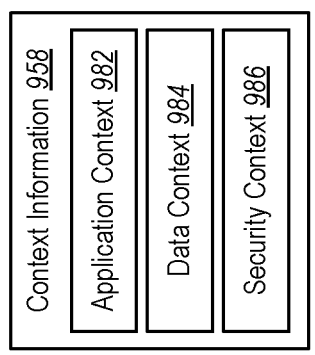
FIG. 9 illustrates an example of context information that can be provided with a request for personal information.

As discussed above, when an application makes a request for personal information (e.g., via an API request 456 or a system call 656, 856), the request can include context information. FIG. 9 illustrates an example of context information 958.

The context information 958 can include information about the entity that is requesting the personal information. This kind of context information 958 may be referred to herein as an application context 982. For example, if the application that is requesting the personal information is a web browser, the application context 982 can identify a website that is requesting the personal information. As another example, if the application that is requesting the personal information is a standalone application such as a word processor, the application context 982 can identify the standalone application.

As indicated above, a personal information manager can store many different kinds of personal information (e.g., passwords and other kinds of user credentials, financial account information, account information for customer loyalty programs, government identification information). In addition to including an application context 982 identifying the entity that is requesting the personal information, the context information 958 can also include information about the type of personal information that is being requested. This kind of context information 958 may be referred to herein as a data context 984.

In some embodiments, the context information 958 can also include information about user authentication that has been performed. This kind of context information 958 may be referred to herein as a security context 986. For example, if the application that is requesting the personal information is running on a computing device that requires authentication, then the security context 986 can include information about the specific kind of authentication that was performed (e.g., username and password, biometric authentication).

Whether a personal information manager authenticates the user (e.g., the authentication 460 performed in the method 400 shown in FIG. 4) can depend on whether the security context 986 indicates that authentication has previously been performed. In some embodiments, if the security context 986 indicates that authentication has not previously been performed, then the personal information manager may proceed with authentication. If, however, the security context 986 indicates that authentication has previously been performed, then the personal information manager may choose to forego additional authentication.

Figure 10:
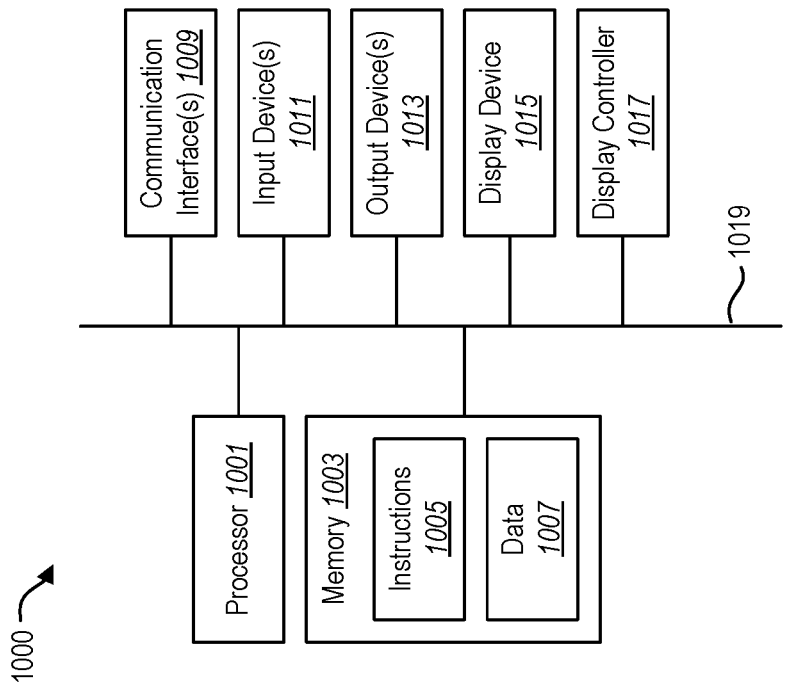
FIG. 10 illustrates certain components that can be included within a computing device.

FIG. 10 illustrates certain components that can be included within a computing device 1000. The computing device 1000 includes a processor 1001 and memory 1003 in electronic communication with the processor 1001. Instructions 1005 and data 1007 can be stored in the memory 1003. The instructions 1005 can be executable by the processor 1001 to implement some or all of the methods, steps, operations, actions, or other functionality that is disclosed herein. Executing the instructions 1005 can involve the use of the data 1007 that is stored in the memory 1003. Unless otherwise specified, any of the various examples of modules and components described herein can be implemented, partially or wholly, as instructions 1005 stored in memory 1003 and executed by the processor 1001. Any of the various examples of data described herein can be among the data 1007 that is stored in memory 1003 and used during execution of the instructions 1005 by the processor 1001.

Although just a single processor 1001 is shown in the computing device 1000 of FIG. 10, in an alternative configuration, a combination of processors (e.g., an ARM and DSP) could be used.

The computing device 1000 can also include one or more communication interfaces 1009 for communicating with other electronic devices. The communication interface(s) 1009 can be based on wired communication technology, wireless communication technology, or both. Some examples of communication interfaces 1009 include a Universal Serial Bus (USB), an Ethernet adapter, a wireless adapter that operates in accordance with an Institute of Electrical and Electronics Engineers (IEEE) 1002.11 wireless communication protocol, a Bluetooth® wireless communication adapter, and an infrared (IR) communication port.

A computing device 1000 can also include one or more input devices 1011 and one or more output devices 1013. Some examples of input devices 1011 include a keyboard, mouse, microphone, remote control device, button, joystick, trackball, touchpad, and lightpen. One specific type of output device 1013 that is typically included in a computing device 1000 is a display device 1015. Display devices 1015 used with embodiments disclosed herein can utilize any suitable image projection technology, such as liquid crystal display (LCD), light-emitting diode (LED), gas plasma, electroluminescence, or the like. A display controller 1017 can also be provided, for converting data 1007 stored in the memory 1003 into text, graphics, and/or moving images (as appropriate) shown on the display device 1015. The computing device 1000 can also include other types of output devices 1013, such as a speaker, a printer, etc.

The various components of the computing device 1000 can be coupled together by one or more buses, which can include a power bus, a control signal bus, a status signal bus, a data bus, etc. For the sake of clarity, the various buses are illustrated in FIG. 10 as a bus system 1019.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "mobile device" can refer to a portable computing device. Some examples of mobile devices include smartphones, tablet computers, laptop computers, head-mounted displays, and smartglasses. In some embodiments, a mobile device may be small enough for a user to hold and operate the mobile device in the user's hand. In some embodiments, a mobile device may be a wearable computing device. In some embodiments, a mobile device may be a mixed reality (or augmented reality) device that is capable of providing a mixed reality (or augmented reality) experience for users. Mobile devices may be capable of connecting to one or more computer networks, such as the Internet. Mobile devices may also be capable of establishing peer-to-peer communication with other computing devices.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method implemented by a first broker on a first computing device, comprising:
   determining by the first broker that an application on the first computing device has requested personal information, wherein the personal information that provides access to the application is stored by a personal information manager on a second computing device, wherein a same user owns the first computing device and the second computing device and the first computing device operates using a first platform and the second computing device operates using a second platform, wherein the second platform is different from the first platform, and wherein there is a trusted connection between the first computing device and the second computing device;

sending a request by the first broker to a second broker on the second computing device to provide the personal information that provides access for the application, wherein the request is sent automatically in response to determining that the application has requested the personal information;

receiving the personal information obtained by the second broker from the personal information manager on the second computing device;

providing the personal information to the application for use by the application to provide access to the application; and launching a second application on the second computing device, the second application corresponding to the first application on the first computing device; and copying the personal information when the personal information manager provides the personal information to the second application.

2. The method of claim 1, wherein:
the first computing device comprises a desktop computer that runs a desktop operating system; and
the second computing device comprises a mobile device that runs a mobile operating system.

3. The method of claim 1, wherein determining that the application on the first computing device has requested the personal information comprises receiving an application programming interface (API) request from the application.

4. The method of claim 1, wherein determining that the application on the first computing device has requested the personal information comprises detecting a system call made by the application.

5. The method of claim 1, wherein sending the request to the second computing device comprises calling an application programming interface (API) that is exposed by a broker on the second computing device.

6. The method of claim 1, wherein the personal information comprises at least one of password information, address information, financial account information, account information for a customer loyalty program, and government identification information.

7. A method, comprising:
receiving a request from a first broker on a first computing device to provide personal information for a first application running on the first computing device, wherein the request is received at a second broker on a second computing device, wherein the personal information that provides access to the first application and is stored by a personal information manager on the second computing device, wherein a same user owns the first computing device and the second computing device and the first computing device operates using a first platform and the second computing device operates using a second platform that is different from the first platform, and wherein there is a trusted connection between the first computing device and the second computing device;

obtaining, by the second broker, the personal information that provides access to the first application from the personal information manager on the second computing device in response to receiving the request; and sending the personal information to the first broker on the first computing device for use by the first application to provide access to the application, wherein obtaining the personal information comprises:

launching a second application on the second computing device, the second application corresponding to the first application on the first computing device; and copying the personal information when the personal information manager provides the personal information to the second application.

8. The method of claim 7, wherein obtaining the personal information comprises sending an application programming interface (API) request to an API that is exposed by the personal information manager.

9. The method of claim 7, wherein obtaining the personal information comprises simulating that a second application on the second computing device is requesting the personal information.

10. The method of claim 7, wherein:
the first computing device comprises a desktop computer that runs a desktop operating system; and
the second computing device comprises a mobile device that runs a mobile operating system.

11. A system, comprising:
a first computing device that operates using a first platform;
a first broker on the first computing device;
an application on the first computing device;
a second computing device that operates using a second platform, wherein the second platform is different from the first platform;
a second broker on the second computing device, wherein the first broker and the second broker facilitate collaborative use of computing resources among the first computing device and the second computing device by exposing an application programming interface (API); and
a personal information manager on the second computing device;
wherein the first broker and the second broker are configured to establish a trusted connection between the first computing device and the second computing device;
wherein the first broker is additionally configured to request, using the API, personal information stored on the second computing device from the personal information manager via the second broker for use by the application to provide access to the application;
receiving the personal information obtained by the second broker from the personal information manager on the second computing device;
providing the personal information to the application for use by the application to provide access to the application; and
wherein the system further comprises a first application on the first computing device, and wherein obtaining the personal information comprises:
launching a second application on the second computing device, the second application corresponding to the first application on the first computing device; and
copying the personal information when the personal information manager provides the personal information to the second application.

12. The system of claim 11, wherein:
the first computing device comprises a desktop computer that runs a desktop operating system; and
the second computing device comprises a mobile device that runs a mobile operating system.

13. The system of claim 11, wherein:
the first broker is configured to automatically request the personal information in response to determining that the application has requested the personal information.

14. The system of claim 11, wherein the first broker is additionally configured to:
determine context information related to the personal information; and
provide the context information to the personal information manager in connection with requesting the personal information.

15. The system of claim 11, wherein:
the second broker is configured to expose the application programming interface (API); and
the first broker is configured to request the personal information from the personal information manager via an API request.

16. The system of claim 11, wherein the second broker is configured to:
obtain the personal information from the personal information manager on the second computing device; and
send the personal information to the first broker on the first computing device.

17. The system of claim 16, wherein obtaining the personal information comprises sending an application programming interface (API) request to an API exposed by the personal information manager.

18. The system of claim 16, wherein obtaining the personal information comprises simulating that an application on the second computing device is requesting the personal information.

* * * * *